United States Patent [19]

Latady

[11] 4,037,939
[45] July 26, 1977

[54] VARIABLE FIELD OF VIEW, VARIABLE MAGNIFICATION LENS ASSEMBLY FOR MINIATURE IMAGE VIEWER

[76] Inventor: William R. Latady, 220 Prospect St., Hingham, Mass. 02043

[21] Appl. No.: 578,411

[22] Filed: May 19, 1975

Related U.S. Application Data

[63] Continuation-in-part of Ser. No. 559,163, March 17, 1975, and a continuation-in-part of Ser. No. 577,983, May 16, 1975.

[51] Int. Cl.$^2$ .............................................. G02B 27/02
[52] U.S. Cl. ................................. 350/241; 350/238; 350/247
[58] Field of Search ................. 40/86 R, 86 A, 106.1; 350/37–39, 44, 183, 186, 235, 238, 239, 241, 244, 243, 247

[56] References Cited

U.S. PATENT DOCUMENTS

| | | | |
|---|---|---|---|
| 1,993,589 | 3/1935 | Borden | 350/241 |
| 2,410,722 | 11/1946 | Eckert | 40/106.1 X |
| 2,548,488 | 4/1951 | Mella | 40/86 R |
| 2,657,487 | 11/1953 | Sprung | 350/241 |
| 3,543,424 | 12/1970 | Klein | 40/86 A X |
| 3,805,429 | 4/1974 | Thompson | 350/241 UX |

FOREIGN PATENT DOCUMENTS

| 42,008 | 2/1917 | Sweden | 40/86 A |
|---|---|---|---|

*Primary Examiner*—F. L. Evans
*Attorney, Agent, or Firm*—John M. Brandt

[57] ABSTRACT

A miniature image viewer having a variable field of view, variable magnification lens assembly is disclosed. The assembly is scannable over the surface of the image to view successive portions which have information not normally discernable to the human eye. The assembly may comprise a zoom lens system or two or more independent lenses, at least one of which is moveable in and out of the field of view of the other.

2 Claims, 6 Drawing Figures

VARIABLE FIELD OF VIEW, VARIABLE MAGNIFICATION LENS ASSEMBLY FOR MINIATURE IMAGE VIEWER

CROSS REFERENCE TO RELATED APPLICATIONS

This application is a continuation in part of Ser. Nos. 559,163 and 577,983 filed Mar. 17, 1975 and May 16, 1975 by the same inventor.

BACKGROUND OF THE INVENTION

1. Field of the Invention:

The invention pertains to miniature image viewers and more particularly to an image viewer having a scannable lens assembly which is of variable field and variable magnification.

2. Description of the Prior Art:

This application presents an improvement in the concept of the miniature hand-held viewer described in the above identified previously filed applications. The purpose of that device was to provide a portable image viewer wherein a large quantity of information could be kept readily at hand on microfilm type transparencies. The viewer described was particularly useful for transporting and viewing miniature maps in the field by explorers, hikers, sailors and the like. In using the maps, it has been found desirable to view a large area of the map at one level of magnification and then to view particular segments at a higher magnification in order to analyze the surrounding terrain in greater detail.

To accomplish this, a scannable lens assembly having a variable field and variable magnification has been devised and is described herein. The inventor knows of no similar device existing in the prior art.

SUMMARY OF THE INVENTION

The invention may be summarized as a miniature image viewer having a scannable lens assembly of variable field of view and variable magnification. It is particularly useful for viewing miniature maps but may be used for viewing other types of images as well.

The scanning system, as shown in detail in the previously filed applications, moves the lens assembly in a plane to scan the surface of the image so that the user may successively examine various parts of the image at high magnification. Means to scan the lens assembly may consist of a pivot assembly to scan in an arcuate pattern, or one or more track pairs to scan in a linear or perpendicular coordinate pattern.

The lens assembly may consist of a zoom lens whose magnification and field are varied by axially moving lenses within the system in relation to each other to provide the desired combination.

A simpler, less expensive system is described in detail herein and consists of two lenses one of which may be moved in and out of the field of the other to provide increased magnification. The entire assembly is moved back and forth with respect to the plane of the image when such a combination is employed. Means to move the assembly may include a conventional bellows and/or scissors arrangement widely used in small cameras, a sliding tube and bayonet lock also used in small cameras, or a threaded cylinder and detent which is shown in detail below.

These and other features and objects of the invention will become more clear from the description of the preferred embodiment and drawings which follow.

DESCRIPTION OF THE PREFERRED EMBODIMENT

Figures 1, 2:
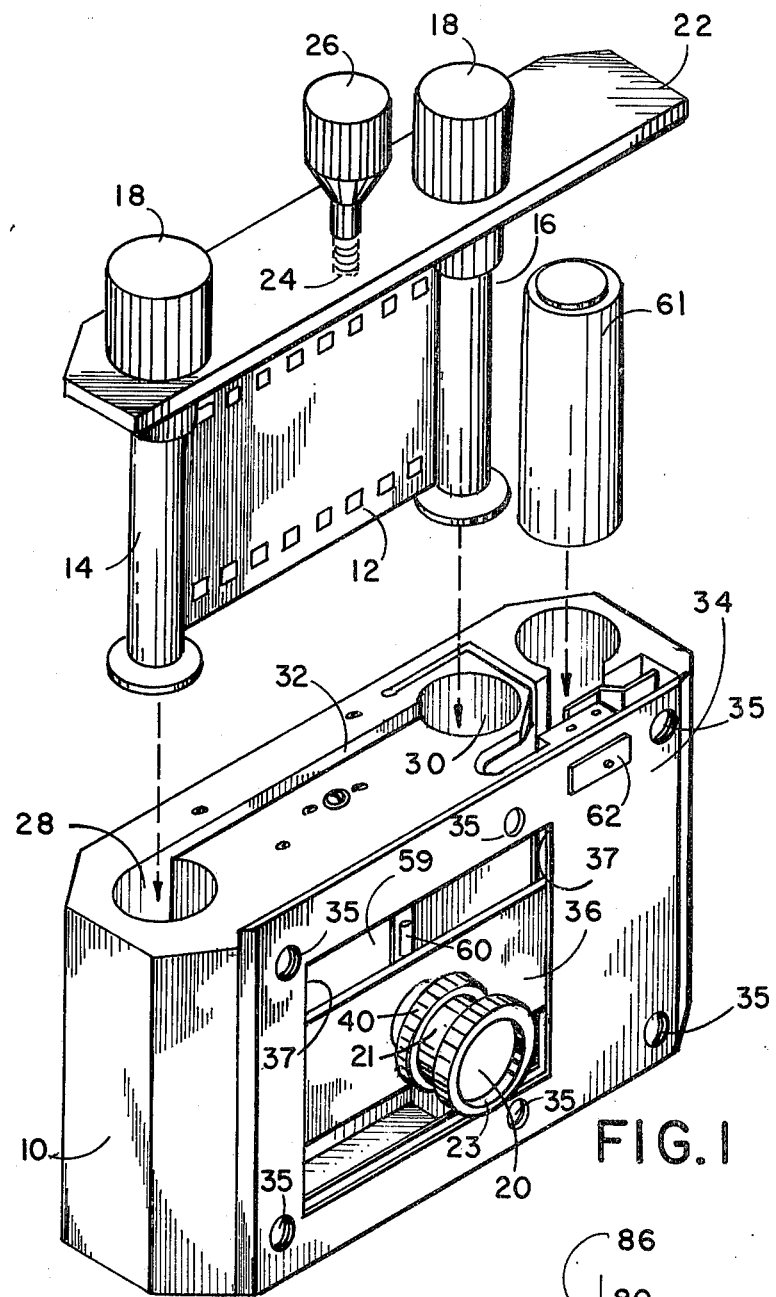
FIG. 1 is an exploded perspective view of a miniature map viewer incorporating one species of the preferred embodiment of the invention.
FIG. 2 is a cross-sectional representation of a second species of the invention.

Referring first to FIG. 1, there is shown in exploded persepective view, a viewer incorporating a variable field of view, variable magnification lens assembly which constitutes the invention. Housing 10 is arranged to hold all of the components of the viewer, and while manufacturable in any conventient size, the device is contemplated as a pocket system. A strip of miniature map images 12, shown as a photographic transparency roll is mounted on rollers 14 and 16 by insertion into longitudinal slots, not shown, in the rollers.

Knurled knobs 18 are used to rotate the rollers to expose various portions of the map in the longitudinal direction to the field of view of the lens assembly 20. Other transport apparatus may be used or individual sheet images may be alternately inserted and removed by the user.

Rollers 14 and 16 are supported by and rotate through top plate 22 which plate forms a cover for the housing. Metal screw 24 attached to knob 26 is used to secure the top plate to the housing, the rollers fitting into tubular orifices 28 and 30 and the map transparency into slot 32 in the housing body.

A separate face plate 34 forming the front of the housing is attached by screws 35. Plate 36 slides up and down in tracks 37 attached to face plate 34 and carries viewing lens assembly 20, a zoom lens system for example. Individual lenses, not shown, are contained in cylinder 21, which is thread mounted in plate 34. The field and magnification of the system are varied by moving the lenses within the cylinder with respect to each other by using ring 40. The assembly is focused by rotating the entire cylinder by focusing ring 23, which is thereby caused to move back and forth in its thread mount.

The design and parameters of the zoom system depend upon the exact dimensions of the viewer. A two to one magnification factor using 15 power as the highest magnification is contemplated. Design of such systems is within the ability of those skilled in the art and the techniques therefore can be found in *Applied Optics and Optical Engineering* Volume 3, Academic Press, New York, 1965, by Rudolf Kingslake.

Movement of the plate along the tracks allows the lens to scan over the image. At its lowest magnification, the entire image from top to bottom is visible, while at the higher magnification the lens is scanned to examine various segments of the image.

Two alternative lighting systems for illuminating the image are employed in the viewer. The first, for viewing in daylight, uses a transparent or transluscent screen 59 in the back of the housing. The screen is oriented toward any source of bright daylight or optionally a source or artifical light which shines through the screen thereby illuminating the image. Additionally, an internal artificial light 60 may be included, powered by battery 61 and activated by micro switch 62. The fine wire connections between switch, light, and battery are not shown but are those which would be obvious. When using such an internal light, screen 59 is scratched or ruled along its length perpendicular to the light beam to scatter the light outward through the transparency, or alternately a light wedge screen may be used to accomplish the same result.

Referring next to FIG. 2, there is shown in cross-sectional representation a second alternative lens assembly. A first high power magnifying viewing lens assembly 64, shown as a combination of two lenses to satisfy the requirements of optical design, is contained in threaded cylinder 66 which is slidably mounted in aperture 68 of plate 70. Plate 70 slides in tracks 72 for scanning purposes similar to the structure described above. A spring-loaded detent, shown in detail in FIGS. 5 and 6, engages a small portion of thread 74 allowing the entire assembly to be slid back and forth through the aperture 68 in the plate by overcoming the holding pressure of the detent. The cylinder may be stopped at any point in the path of travel and then finely focused on image plane 76 using focusing ring 78 to rotate the entire assembly.

A second lens 80 is mounted in ring 82, which ring is rotatably mounted on pivot bar 84 attached to focusing ring 78. The entire lens may be moved in and out of the field of view of the first lens 64 by rotating ring 82. It is axially aligned along axis 86 when rotated into the field of view. FIG. 2 illustrates the two lenses in a position for high magnification and limited field of view. The power of each of the lenses is a matter of choice, depending upon the magnification and field of view desired. As an example, lens 64, the first lens, may be chosen as 7 or 8 power, the second lens 80 as 2 power, the two producing a combined magnification of 14 or 16.

Figure 3:
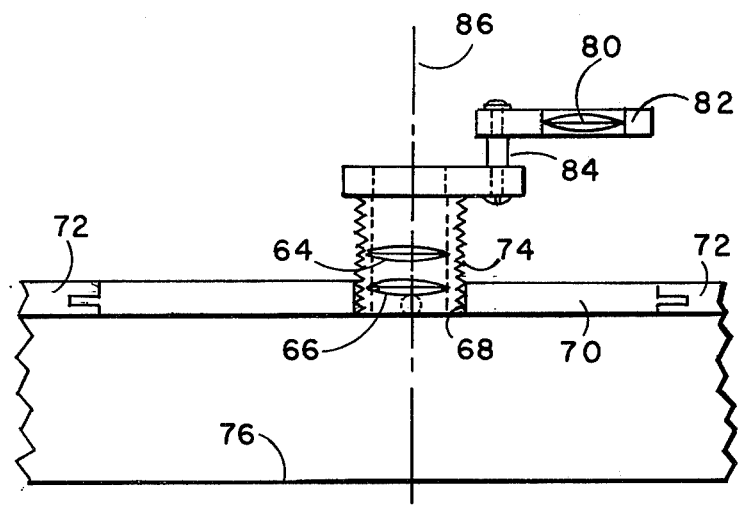
FIG. 3 is an additional cross-sectional representation of the embodiment of FIG. 2 showing the components in an alternate position.

FIG. 3 shows the assembly of FIG. 2 in the wider field of view, lower magnification position. The second lens 80 is swung out of the field of view of the first lens and the entire assembly is raised to provide a refocusing position for only the first lens.

Figure 4:
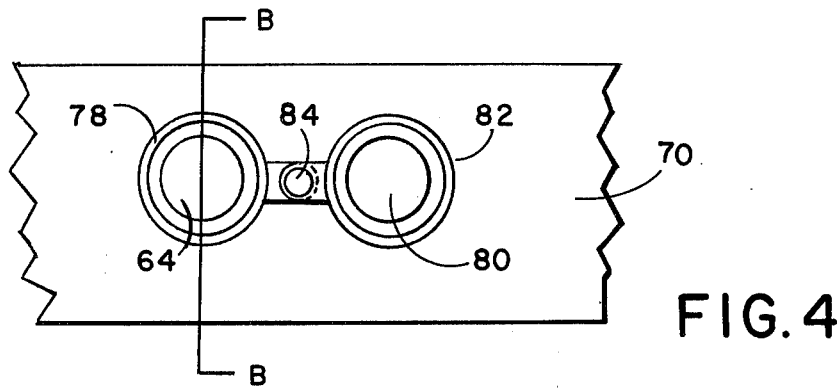
FIG. 4 is a top view of FIG. 3.

FIG. 4 is a top view of FIG. 3 illustrating the shape of the mounting and focusing rings.

Figure 5:
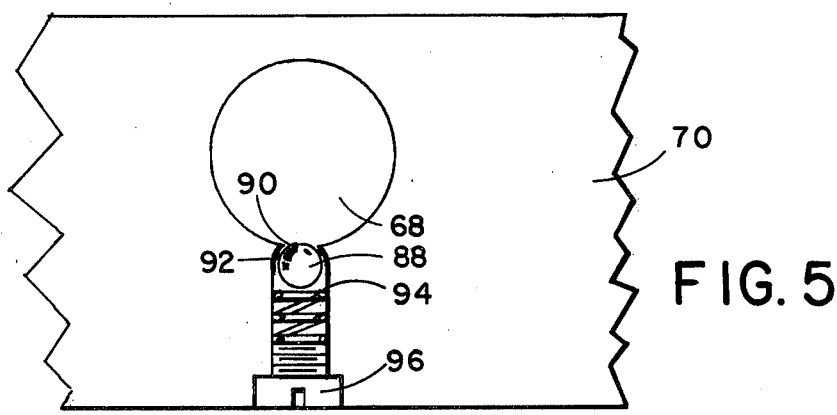
FIG. 5 is a cross-sectional top view of FIG. 2 taken along line A—A.
Figure 6:
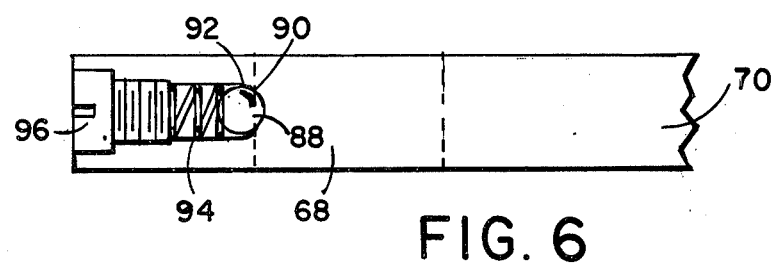
FIG. 6 is a cross-sectional side view of FIG. 4 taken along line B—B.

FIGS. 5 and 6 illustrate the detent used to hold the lens assembly in place. A ball 88 protrudes into aperture 68 through a hole 90 smaller than the diameter of the ball. The ball is seated in cone-shaped orifice 92 positioned edgewise in plate 70 and is biased into the aperture by spring 94 contained by screw 96. As will be obvious, other detent arrangements might be employed. For example, when the components are manufactured of synthetics, the detent may be molded directly into the plate.

It is expected that variations in the above described apparatus and its uses will become obvious to those skilled in the art from the foregoing disclosure. The invention is accordingly defined by the following claims.

What is claimed is:

1. A miniature image viewer employing a scannable magnifying lens adapted for viewing images having information of a size not normally discernable to the human eye, said viewer comprising in combination:
   a. a housing;
   b. means for mounting a planar image within said housing;
   c. means for illuminating said image;
   d. a variable field of view, variable magnification lens assembly mounted within said housing, said assembly having a variable focal length for viewing at least a portion of said image at a first magnification and for viewing a lesser portion of said image at a second higher magnification, said assembly comprising a variable magnification zoom lens system; and
   e. lens scanning means arranged to move said lens assembly in a plane to scan the surface of said image.

2. A miniature image viewer employing a scannable magnifying lens adapted for viewing images having information of a size not normally discernable to the human eye, said viewer comprising in combination:
   a. a housing;
   b. means for mounting a planar image within said housing:
   c. means for illuminating said image;
   d. a variable field of view, variable magnification lens assembly mounted within said housing, said assembly having a variable focal length for viewing at least a portion of said image at a first magnification and for viewing a lesser portion of said image at a second higher magnification; said lens assembly comprising:
      1. a lens assembly mounting plate having a circular viewing aperture, said plate scannably mounted on said housing and arranged to move said lens assembly in a plane to scan the surface of said image;
      2. an externally threaded cylindrical lens mount, said cylindrical lens mount slidably disposed within said mounting plate viewing aperture;
      3. a detent positioned along the edge of said aperture arranged to engage a portion of the surface of said threaded cylinder;
      4. a first magnification lens having a lens axis mounted within said cylindrical lens mount;
      5. a second magnification lens spaced a fixed axial distance from said first lens; and
      6. means for moving said second lens in and out of the field of view of said first lens mounted upon said cylindrical lens mount.

* * * * *